(12) United States Patent
Pruitt

(10) Patent No.: US 6,179,490 B1
(45) Date of Patent: *Jan. 30, 2001

(54) METHOD AND APPARATUS FOR CREATING A FLOWCHART USING A PROGRAMMED COMPUTER WHICH WILL AUTOMATICALLY RESULT IN A STRUCTURED PROGRAM

(75) Inventor: Leonard E. Pruitt, The Colony, TX (US)

(73) Assignee: Telefonaktiebolaget LM Ericsson, Stockholm (SE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/172,290

(22) Filed: Dec. 23, 1993

(51) Int. Cl.⁷ ........................................ G06F 9/45
(52) U.S. Cl. .............................. 395/702; 345/356
(58) Field of Search ..................... 345/356, 357, 345/358, 433, 339, 335, 348; 395/670, 701, 702, 800.01

(56) References Cited

U.S. PATENT DOCUMENTS

| 4,153,932 | 5/1979 | Dennis et al. | 395/800.27 |
| 4,546,435 | 10/1985 | Herbert et al. | 395/705 |
| 4,831,580 | * 5/1989 | Yamada | 345/433 |
| 4,852,047 | 7/1989 | Lavellee et al. | 364/191 |
| 4,872,167 | 10/1989 | Maezawa et al. | 395/183.14 |
| 4,914,568 | 4/1990 | Kodosky et al. | 345/349 |
| 4,956,773 | * 9/1990 | Saito et al. | 395/703 |
| 5,005,119 | 4/1991 | Rumbaugh et al. | 395/671 |
| 5,133,045 | 7/1992 | Gaither et al. | 706/46 |
| 5,136,705 | * 8/1992 | Stubbs et al. | 395/183.01 |
| 5,187,788 | * 2/1993 | Marmelstein | 395/703 |
| 5,293,476 | * 3/1994 | Wolber et al. | 345/356 |
| 5,313,574 | * 5/1994 | Beethe | 345/356 |

OTHER PUBLICATIONS

"Structured Diagrams—a software design tool", Moore, D.T. & T.A. Galloway, *Proceedings of the Online Conference on Pragmatic Programming & Sensible Software*, London, England, Feb. 1978, pp. 351–359.

"PICA —a graphical program development tool", A.A. Törn, *Acta Cybernetica*, vol. 9, Szeged, 1990, pp. 303–321.

"Stimulus–Response Machine: An Ada–Based Graphic Notation for Specifying, Designing, and Implementing Reactive or Interactive Systems", G.W. Cherry, *Ada Letters*, Jul./Aug., 1991, vol. XI, No. 5, pp. 30–46.

"PegaSys: A System for Graphical Explanation of Program Designs", M. Moriconi and D. Hare, *ACM Sigplan Notices*, vol. 20, No. 7, Jul. 1985, pp. 148–160.

"Code Generation From Data Flow Diagrams", C. Olson et al., *IEEE Third Int'l Workshop on Software Specification and Design*, Aug. 26–27, 1985, Gloucester Hotel, London pp. 172–176.

(List continued on next page.)

* cited by examiner

Primary Examiner—Viet D. Vu
(74) Attorney, Agent, or Firm—Burns, Doane, Swecker & Mathis, L.L.P.

(57) ABSTRACT

The present invention relates to a method of creating a structured flowchart using a programmable computer and a programmable computer display such that any program created from the flowchart would be a structured program, the method including the steps of displaying a predetermined set of basic flow forms on a first display area, providing a means by which a user can select two flow forms from the set of flow forms, combining the two selected flow forms by placing one of the flow forms inside any statement box of another of the selected flow forms to yield a new valid flow form according to information provided by the user, and displaying the selected flow form and any new valid flow forms in a second area on the display. An apparatus for assembling a flowchart on a programmable computer display is also provided.

14 Claims, 9 Drawing Sheets

OTHER PUBLICATIONS

"The PegaSys System: Pictures as Formal Documentation of Large Programs", M. Moriconi and D. Hare, *ACM Trans on Programming Languages and Systems*, vol. 8, No. 4, Oct. 1986, pp. 524–546.

"Structured Flowcharts for the Specification of Parallel Programs", V. Sunderam *Parallel Computing 89*, Sep. 1989, pp. 437–442.

"GRASE—A Graphical Syntax–directed Editor for Structured Programming", M. Albizuri–Romero, *SIGPLAN Notices*, V.19, #2, Feb. 1984, pp. 28–37.

"Programming Interactively with a Graphical Abstract Programming Language", M. Albizuri–Romero, *SIGPLAN Notices*, V. 24, No. 11, Nov. 1989, pp. 116–124.

"Automated Graphics for Function Design", G. Hemdal, *IEEE Glocal Telecommunikcations Conf*, GLOBECOM '84 Conf. Record. Communications in the Information Age Atlanta, GA, 26–29, Nov. 1984, vol. 2, pp. 1024–1029.

"HICHART—a hierarchical flowchart description language", T. Yaku et al., *Proceedings of COMPSAC 87*, 11th Annnual Int'l. Computer Software * Applications Conf., Tokyo, Japan, Oct. 1987, pp. 157–163.

"Interactive graphical program development", P. Keune and C. Rothteich, *Online* (Germany), No. 5, Jun. 1982, pp. 72–75.

"The design & construction of hierarchically structured software", R.W. Witty, *Proceedings of the Online Conference on Pragmatic Programming & Sensible Softare*, London, England, Feb. 1978, pp. 361–388.

"On the evolution of graphical notations for program design", P. Robillard, *SIGSOFT Software Engineering Notes*, vol. 14, No. 1, Jan. 1989, pp. 84–88.

"Structures and graphics make in the designer", Lehner et al., *Output*, vol. 17, No. 5, pp. 39–45 (May 10, 1985).

Prashant Waknis et al., "A Graphical Programming Environment for Stimulation of Control and Signal Processing Systems", Institute of Electrical and Electronics Engineers, pp. 447–450, XP000338761,vol. 1, 12 Apr. 1992, Proceedings of the Southeast Conference (Southeastcon), Birmingham, Alabama, Apr. 12–15, 1992.*

"Graphic Programming Language, IBM Technical Disclosure Bulletin", vol. 25, No. 12, May 1993, New York, U.S. pp. 6497–6501, XP002020927.*

T. Shepard et al., "A Visual Software Process Language", Communications of the Association for Computing Machinery, vol. 35, no. 4, Apr. 1992, pp. 37.44, XP000328670.*

Gill, Phillip J., "Casemaker SDW" *Uniform Monthly*, Apr. 1993, vol. XIII, No. 4, and certified translation thereof.*

METHOD AND APPARATUS FOR CREATING A FLOWCHART USING A PROGRAMMED COMPUTER WHICH WILL AUTOMATICALLY RESULT IN A STRUCTURED PROGRAM

BACKGROUND

The present invention is directed to a method and apparatus for creating a structured computer program, that is, a method and apparatus for creating a flowchart using a programmed computer which will automatically result in a structured program. In particular, the present invention relates to a method and apparatus for creating a flowchart such that any program code created from the flowchart will be a structured program.

There are numerous existing flowchart programs (see, for example, U.S. Pat. Nos. 4,546,435, 4,872,167, 4,852,047); however, none of the existing systems encourage, promote or require that the flowcharts which they create are structured according to the rigorous graphical notation used in the present invention. Source code or flowcharts which are not structured are said to be a "can of worms" or "spaghetti". There are degrees of "spaghetti" depending on the degree of deviation from pure structured flowchart or code. Non-structured flowcharts (or code derived from non-structured flowcharts) are known to have more errors and be more difficult to maintain than structured flowcharts or code.

Companies that deliver products with embedded computers (such as the products that telecommunication switching-equipment companies deliver) depend more and more heavily on software. This is because the value added to the product, the software included, is becoming a larger and larger part of the investment in the product. The intelligence provided by the software is more and more valuable to the customer.

Customers want products delivered ever faster. They want more intelligence in the products they buy. For systems such as, for example, telephone switches, this means more features in the switch. The features requested and desired become more complicated each year. However, companies have often had great difficulty in delivering software with the desired functionality on time and with high quality. The company able to deliver high-quality software on time, with the desired functionality with have a tremendous competitive advantage over a company that is not able to do this.

The larger the quantity of code in a product or project, the more important it is that the code be structured. Structured code is also a very important component of the method to use to develop correct code. Code that is correct upon delivery is much less expensive overall to create than code that must be corrected after delivery. The software designer is perhaps the most scarce and expensive resource in this process of code development. The designer's time must be used in an effective way. The most effective way for a software designer to use his time is to design and write structured code. This goal is difficult to achieve using today's software development tools, since it is left to the designer to ensure that the flowchart or code he is developing is structured.

SUMMARY

It is accordingly an object of the present invention to provide a software development tool that will enable software designers to easily and efficiently develop structured software so as to achieve a better quality product, made less expensively.

It is another object of the present invention to provide a software development tool that will enable the development of software that is structured to enable the delivery of complex, software-intensive products on time and with higher quality.

It is another object of the present invention to provide a software development tool that will enable the software developed to have the properties necessary to help ensure profitability.

According to one embodiment of the present invention, a method of creating a flowchart using a programmable computer and a programmable computer display, such that any program created from the flowchart would be a structured program, the method including the steps of displaying a predetermined set of basic flow forms on a first display area, providing a means by which a user can select two flow forms from the set of flow forms, combining the two selected flow forms by placing one of the flow forms inside any statement box of another of the selected flow forms to yield a new valid flow form according to information provided by the user, and displaying the selected flow form and any new valid flow forms in a second area on the display. The basic flow forms are a statement box, a sequence of two statement boxes, iteration forms for FOR and WHILE statements, and alternation forms including boolean forms for IF-THEN and IF-THEN-ELSE statements and CASE statements.

According to an embodiment of the present invention, an apparatus is provided for assembling a flowchart on a programmable computer display including means for displaying on the screen a set of basic flow form icons, each icon comprising at least one polygon having one input line and one output line, each icon having one input line and one output line, user input means for enabling a user to select at least one of the basic flow form icons, and means for displaying the selected icon on a different area of the screen in a position designated by the user.

The apparatus according to one embodiment of the present invention further includes user input means for inputting text to be associated with the at least one polygon in the at least one selected icon, and means for displaying the inputted text in an area adjacent the at least polygon in the at least one selected icon.

Each icon in the apparatus according to one embodiment of the present invention includes a rectangular or square polygon and the means for displaying the selected icon includes means for combining two selected flow form icons, means for determining when the position designated for displaying the selected icon by the user is correct according to predetermined rules, and means for prohibiting operation of the means for displaying the selected icon responsive to a determination by the means for determining that the position designated is incorrect according to the predetermined rules.

According to an embodiment of the present invention, an apparatus is provided for assembling a flowchart on a computer display including means for displaying in a first area of the display a predetermined plurality of flowchart icons, each icon comprising at least one statement box, an input line and an output line, user input means for indicating selection of one of the plurality of flowchart icons, user input means for indicating placement of the selected icon in a second area of the display, means for determining whether the indicated placement of the selected flowchart icon satisfies predetermined rules, the rules allowing for placement of one icon inside a statement box of another previously selected icon to form a new flowchart icon, allowing for placement of one icon in a head-to-tail relationship with another icon, allowing only downward flow of control within the flowchart, and prohibiting crossing of any flow line within the flowchart, and means for temporarily adding to the predetermined plurality of flowchart icons any new flowchart icon created by the user input means for indicating placement.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The invention of the present application will now be described in more detail with reference to the preferred embodiments of the device, given only by way of example, and with reference to the accompanying drawings, in which.

DETAILED DESCRIPTION

In this description, the word "structured" is used as an adjective to describe code or flowcharts which have particular and very precisely defined properties. When it is used as in the phrase "please structure this piece of code", it is a verb which indicates a particular action which is to be performed on the code or flowchart.

All code which will compile without errors or assemble without errors (in the case of assembly language) is "structured" in the sense that it is "organized" at some level. If the code were not organized in the sense of meeting the syntactic rules of the language, then it would not compile or assemble. However, that is not at all what is meant by the word "structured" in this application. The word "structured" as it is used herein has a precise definition which will be described further below.

The program according to the present invention, which has the novel attribute that it can require structured flowcharts will, by virtue of the inherent properties of structured flowcharts, increase the probability that the flowcharts, created by the use of it, will be more nearly correct. Flowcharts or code derived from them which are correct from the beginning are very economically advantageous. The present invention may save millions of dollars per year for those who employ it.

Figure 1:
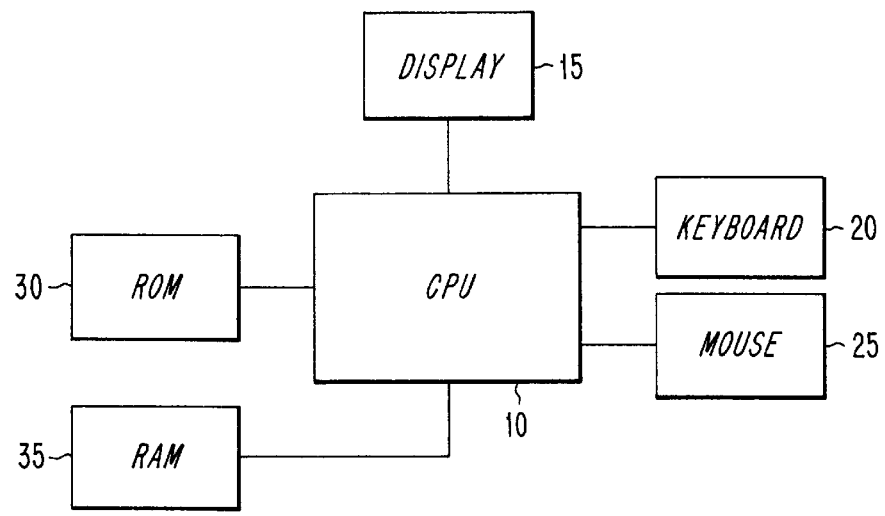
FIG. 1 is a schematic illustration of a computer system in which the present invention is implemented.

FIG. 1 schematically illustrates an embodiment of the hardware which can be used to implement the present invention. A CPU 10 is provided which executes the program code for implementing the present invention, which is stored in ROM 30. There is also RAM 35 for storing temporary data. A display 15 is provided connected to the CPU on which the user interface of flowchart icons is displayed along with the display area in which the flowchart itself is created by the user. Keyboard 20 is provided for the user to input the commands to the computer program. A mouse 25 may also be provided to allow additional user control, such as click and drag movement of the flowchart icons provided according to the present invention.

There are six basic flow forms or flow form icons that may be combined according to a set of rules to produce structured flowcharts according to a preferred embodiment of the present invention. These six basic flow forms are shown in FIGS. 2A through 2F discussed below. For purposes of this discussion, the terms "flow forms" and "flow form icons" will be used interchangeably.

According to the present invention, three rules should be followed in combination with the use of the basic flow forms to force a structured program as follows:

1. Select two flow form icons from the set of valid flow form icons. Choosing the same flow form icon twice counts as selecting two flow form icons. Those two selections must be combined according to rule 2.

2. The combinatorial rule: any valid flow form may be placed inside any statement box of another valid flow form. It is permissible to place a copy of a flow form icon inside one of its own statement boxes.

3. Any flow form which has been derived according to the combinatorial rule is itself a valid flow form icon and may then be used as if it were one of the six basic flow form icons. Program development continues (if necessary) by returning to step 1 and selecting among the set (now possibly extended) of valid flow form icons.

Figure 4A:
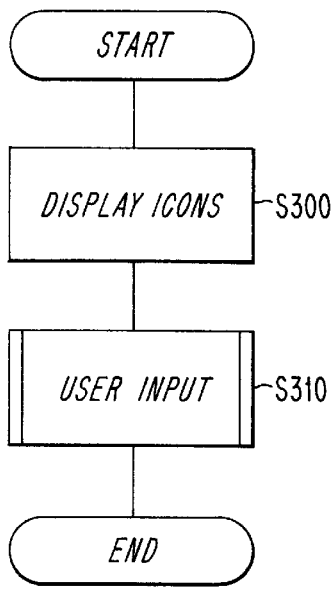
FIGS. 4A–4E illustrate flowcharts of a preferred embodiment of the present invention.
Figure 4E:
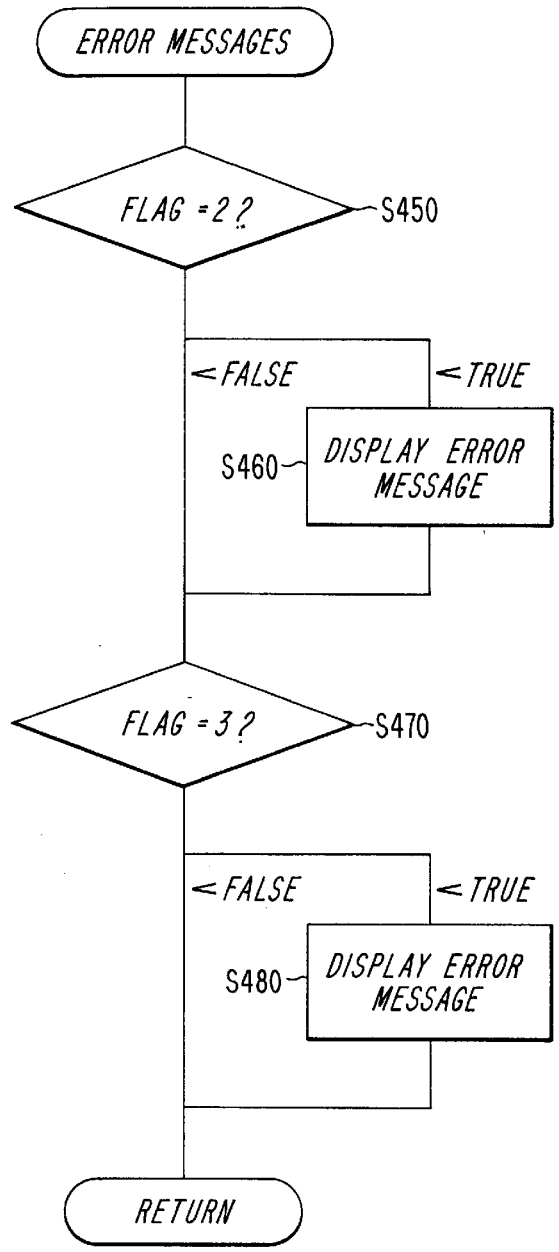
Figure 4B:
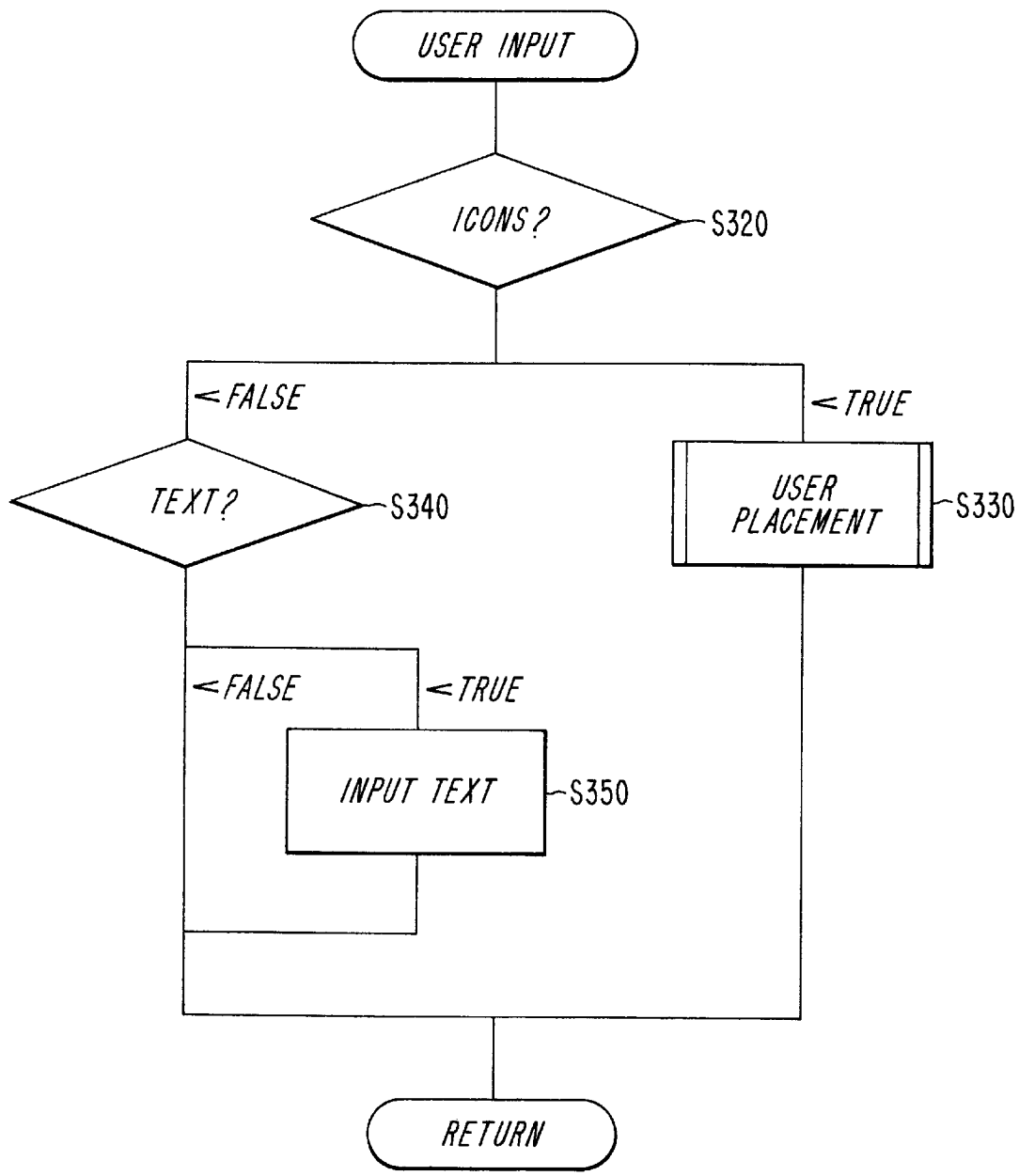

By definition, then, a structured flowchart according to the present invention is one which was (or could have been) created using the six basic flow form icons and following the above three rules. As a practical matter, the implementation of the program according to the present invention includes an exception to the second rule which allows head-to-tail connection of two selected flow forms as opposed to inserting one into a statement box of another. This is allowed because the implementation of the program according to the present invention is not required to work exactly according to the three rules. What it must do is yield results that could have been obtained by following the three rules. For example, to create a simple program with just three sequential statements, one could choose a sequence flow form (FIG. 2B) and choose another sequence form and place it inside the second statement box of the first sequence flow form. When the combination formed is expanded, it results in a three statement sequence flow form. As a practical matter, rather than requiring the user of the present invention to choose that sequence of flow forms, one embodiment of the present invention (as shown in FIG. 4D) allows the user to choose a single statement icon, followed by a sequence icon placed in a head-to-tail relationship to yield the same three statement sequence flow form.

There are a number of rules and flow form icons or graphs which could be developed to implement and create a structured program. The set of rules and flow form icons that are listed above is not the only possible set.

In trying to establish a specific set of rules and flow forms, there is a balance which must be struck between the number of flow forms and the number and complexity of the rules. According to the present invention, a system is being established that can be used to create any program whatsoever that can be written. This means that the rules have to be able to cover programs that are one line long as well as those that are 100 million lines long. In order to cover this range, the statement icon of FIG. 2A and sequence icon of FIG. 2B are both included in the set of valid flow forms according to a preferred embodiment of the present invention.

For example, if a designer wishes to write a program which is exactly one line long and wishes to do it according to the rules of structured programming according to the present invention, then the single statement flow form will be chosen twice and inserted into itself. Then the process stops. The program is written. It is structured because it has been written according to the rules.

If either or both of the first two flow form icons were omitted, then the rules would have to become more complicated in order to specify, according to an algorithm, how to structure code. Following these rules guarantees that the program that is produced will be structured.

Within the scope of the invention, it is also possible to define a slightly different set of flow forms and a slightly different set of rules and get the same results. The rules, as they are described above, allow the user to write a program (or subroutine) only one line long. (The user chooses the statement box flow form and puts it inside itself.) However, a special rule may be added that requires that if only one statement (flow form) is needed in the program, then the user can select the one desired flow form and then stop. The cost of this is the addition of the new rule, since there are still six basic flow forms and an additional rule.

The rules given above are complete. If a program has been or could have been, constructed according to the three rules for structured coding in conjunction with the six basic flow form icons, then that program is structured. If a program (or flowchart) has been devised in such a way that it is not possible to re-create it by following the rules for structured code, then the program is not structured.

Thus the standard for determining whether or not a program is structured is absolutely objective. No subjective judgement is required. Thus, a computer program according to the present invention is ideal for determining whether the program is structured.

The six basic flow forms will now be discussed with reference to FIGS. 2A–2F. As the flow forms are displayed using the user interface portion of the program according to a preferred embodiment of the present invention, they are also referred to as icons.

Figure 2A:
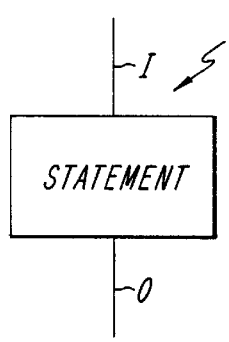
FIGS. 2A–2F illustrate the basic flow form icons used in a preferred embodiment of the present invention.
Figure 2B:
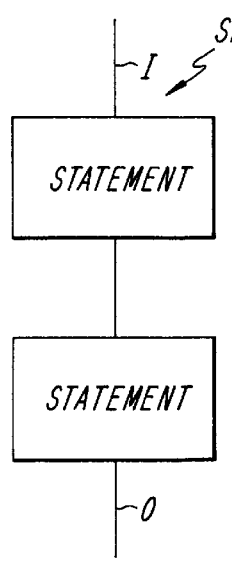
Figure 2C:
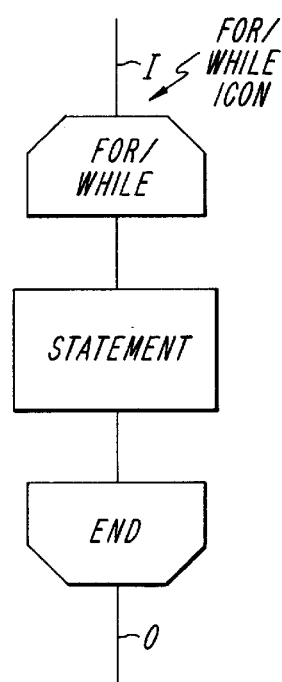
Figure 2D:
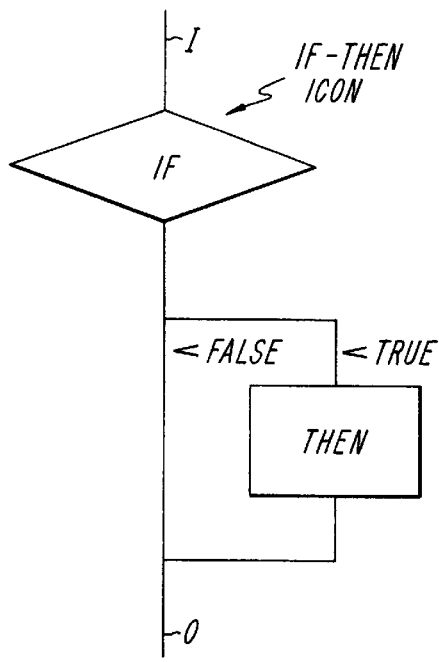
Figure 2E:
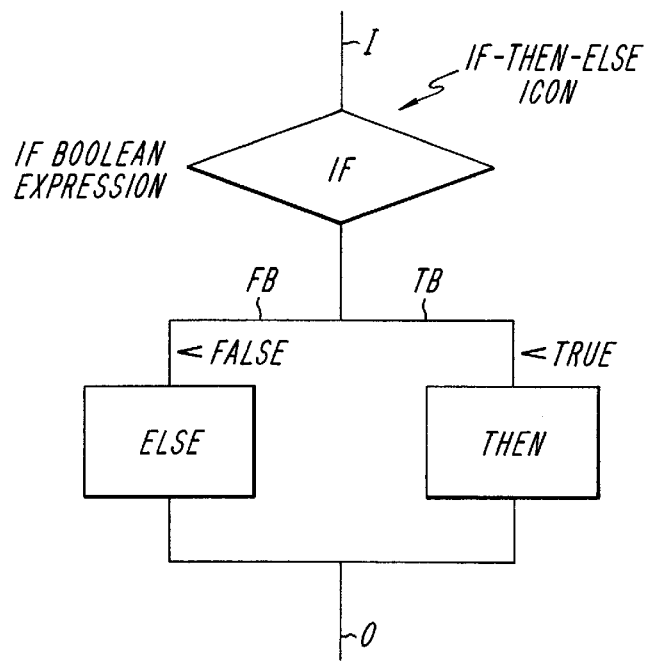
Figure 2F:
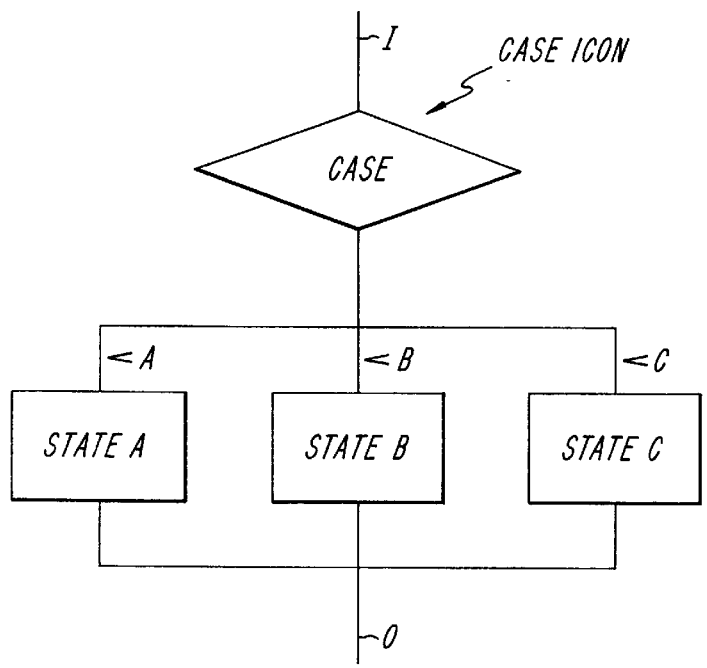

FIG. 2A illustrates a statement icon and FIG. 2B illustrates a sequence icon according to a preferred embodiment of the present invention. FIG. 2C represents iteration forms for indicating FOR and WHILE language constructs according to a preferred embodiment of the present invention. FIGS. 2D and 2E illustrate one type of alternation form icons, and in particular boolean form icons, representing the IF-THEN and IF-THEN-ELSE language constructs according to a preferred embodiment of the present invention. FIG. 2F illustrates another type of alternation form icon representing the CASE language construct according to a preferred embodiment of the present invention. That is, depending on the results of the test specified in or adjacent to the diamond, one of the paths is chosen from the set of paths in the flow form.

Each icon consists of one or more polygons connected by input line I and an output line O. Each icon has only one input line I and one output line O. Each polygon in the icon also has only one input line and one output line. The output line for each icon is placed directly below the input line for that icon.

The FOR and WHILE statements both require a boolean expression within them to function; however, since the emphasis within these forms is on looping rather than branching, they are referred to as iteration forms rather than boolean forms.

A number of conventions are implemented in the program according to the present invention relating to the boolean flow forms, the IF-THEN and IF-THEN-ELSE boolean statements. In particular, the IF-THEN offers two paths. The TRUE side has a statement box whereas the FALSE side does not have a statement box. This rule is built into the icon by the provision of the TRUE and FALSE labels within the icon. By definition, the IF-THEN does not have a statement box in the FALSE path. This convention has been established according to the present invention for flowcharts because this is a convention for source code. Part of the goal is to make the flowchart and source code alike. The IF-THEN statement in source code cannot, by definition, have a statement box for the FALSE path.

If the user wishes to execute a statement box in the IF-THEN statement when the boolean expression is false, then a NOT should be put in front of the boolean expression. That will negate the expression. If the expression then evaluates to false, the NOT will make it true, and so the statement box of the IF-THEN will be executed when the inner boolean expression is false. Note that the boolean expression as a whole (including the NOT) should be true when the statement box is executed.

As can be seen, the TRUE and FALSE alternative paths are not drawn coming out of the sides or bottom of the decision diamond as was conventional practice in the past. This is because it is often difficult to place the complete boolean expression inside the decision diamond. There is plenty of room to place even a long boolean expression beside the decision diamond; however, this requires movement of the paths to just below the diamond itself.

According to the present invention an IF-THEN or IF-THEN-ELSE is only used in conjunction with a boolean expression. The boolean expression can only evaluate to TRUE or FALSE. There are no alternatives.

By convention according to the present invention, the TRUE branch is placed on the right side for both the IF-THEN and the IF-THEN-ELSE statements. This convention is based on the fact that virtually all languages are defined in such a manner that for IF-THEN-ELSE statements, if the boolean expression evaluates FALSE, the first or top set of statements is executed. If the boolean expression evaluates to FALSE, then the second or bottom set of statements is executed. According to Western culture, top is associated with right is associated with true. Similarly, bottom is associated with left is associated with false. Thus, the drawing convention according to the present invention is an extension of architectural conventions of computer languages in combination with standard cultural traditions.

In FIGS. 2D and 2E, the true-false labels are provided in the icon according to a preferred embodiment of the present invention. The "IF boolean" expression is not; it is user-added using the program according to a preferred embodiment.

In the structured flowcharting technique implemented by the present invention, there can be no lines which flow upward. Since there are no lines that flow upward, that means that there is never any need to use arrows in the flow lines. All flow lines flow downwards. This convention reduces clutter in flowcharts. Since they are then cleaner, they are also easier to read. There is never a need to look for arrows to indicate direction of flow. Another significant convention is that there is never any need for flow lines to cross one another in a structured flowchart.

In principle, off page connectors are not allowed in flowcharts developed according with the use of the method and apparatus according to the present invention. There are a number of exceptions to this rule. Off page connectors are allowed in the case of the CASE statement that has such a large number of cases that the CASE statement runs off the page.

When the flowchart is drawn describing a finite state machine (FSM), the state symbol behaves like a CASE statement. Each signal that can be received within that state is analogous to a case in a CASE statement. A state of this type is also called a "wait" state. The wait state is effectively acting as a signal reception point. Off page connectors are allowed in the case of a state that has a large number of possible signals or events that can be received at that point. It is considered within the skill of the ordinary artisan to use off page connectors in the implementation of the program according to a preferred embodiment of the present invention.

Figure 3A:
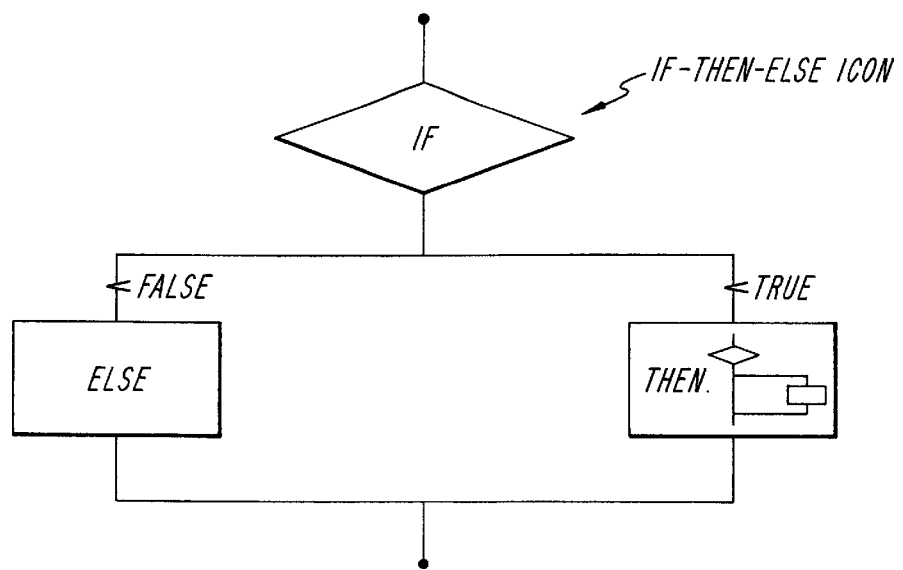
FIGS. 3A–3E illustrate various flowcharts that can be created according to a preferred embodiment of the present invention.
Figure 3B:
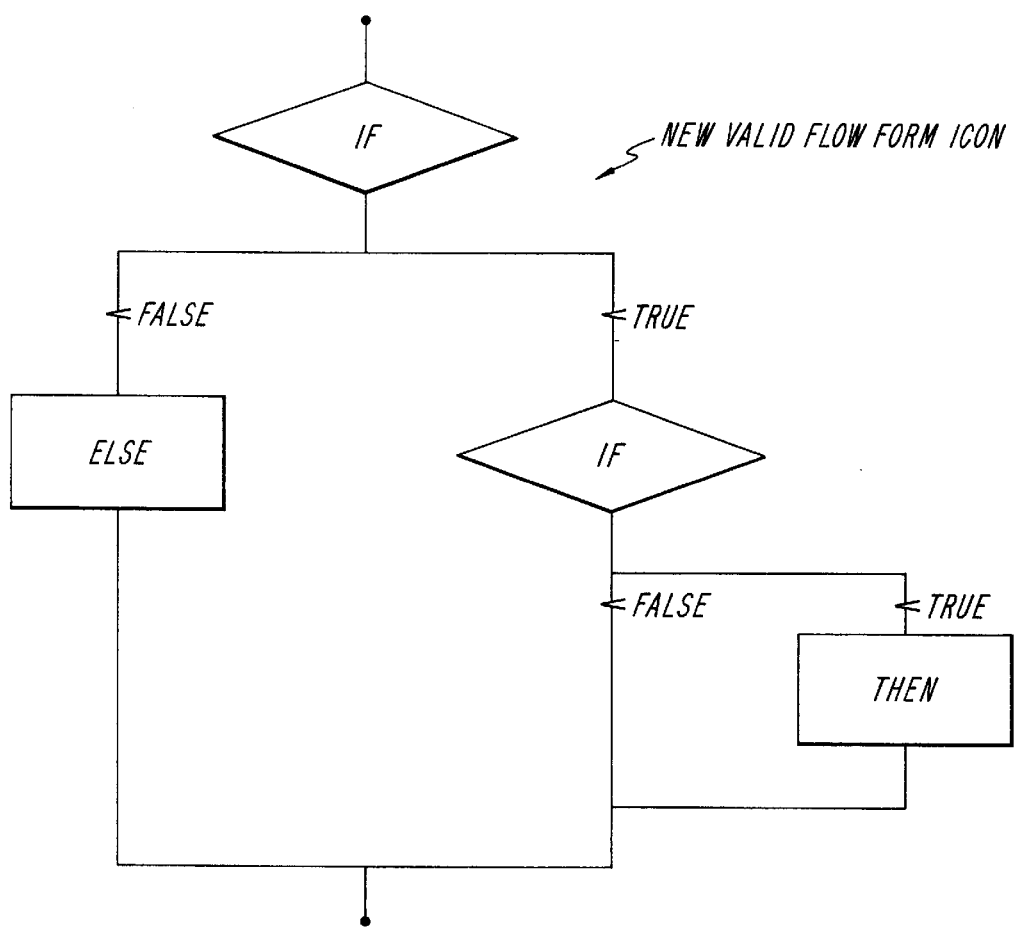

FIG. 3A illustrates how a flow form icon can be placed inside an appropriate statement box of another flow form icon. The resulting newly constructed valid flow form is shown in FIG. 3B, which illustrates an IF-THEN-ELSE flow form with an IF-THEN flow form inside the statement box on its TRUE side. This newly constructed valid flow form can then be listed among the original six basic flow forms icons. At this point, the newly constructed flow form may be combined with another flow form by placing the new flow form inside one of the other's statement boxes or some pre-existing flow form may be placed inside one of the new flow form statement boxes. Also, a newly constructed flow form can be duplicated and placed inside one of its own statement boxes. According to the present invention, these constructed flow forms are temporarily stored in memory and do not become part of the predetermined set of six basic icons.

This process of combining valid flow forms is repeated continuously by the user until the program he wants is finished.

Figure 3C:
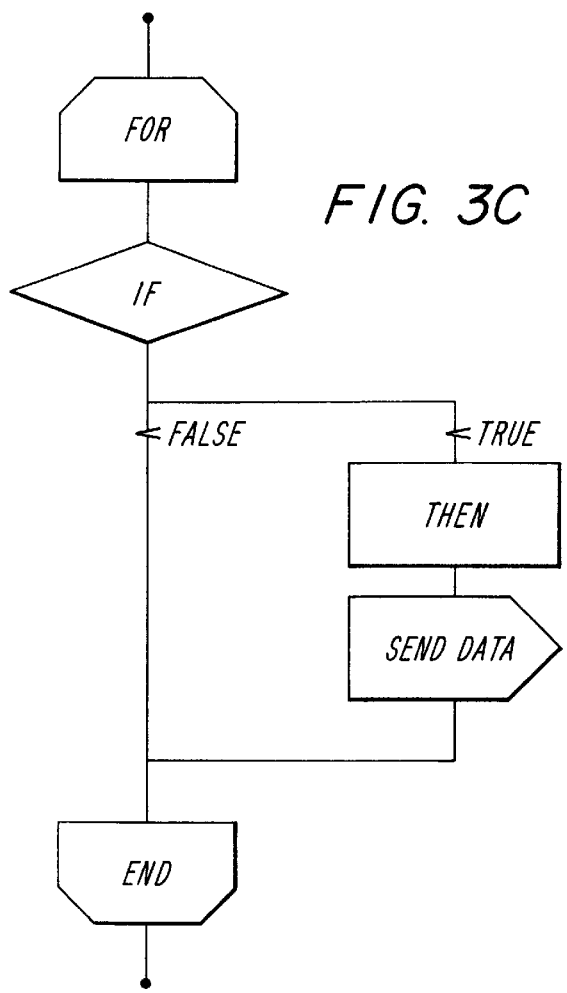

FIG. 3C shows an IF-THEN icon placed inside a FOR loop. Inside the IF-THEN statement there is a sequence of two statements, shown in FIG. 3C as a statement box and a signal sending statement box. The signal sending statement box is an example of an individual, rectangular statement box changed to a special shape to represent a special type of statement. These special shapes may be implemented as the shapes typically used in known flowcharting techniques for statements such as sending output to a printer device, storing a value in memory, etc. These special shapes do not affect the flow through a program, but are included to conform the program to requirements of the application. The choice of which of these special shapes are available is left to the ordinary artisan in possession of this disclosure. One embodiment of the present invention, not shown in the drawings, is programmed such that after the user chooses one of the basic flow forms, he can then change a rectangular polygon in the form to one of the available special shapes.

Figure 3D:
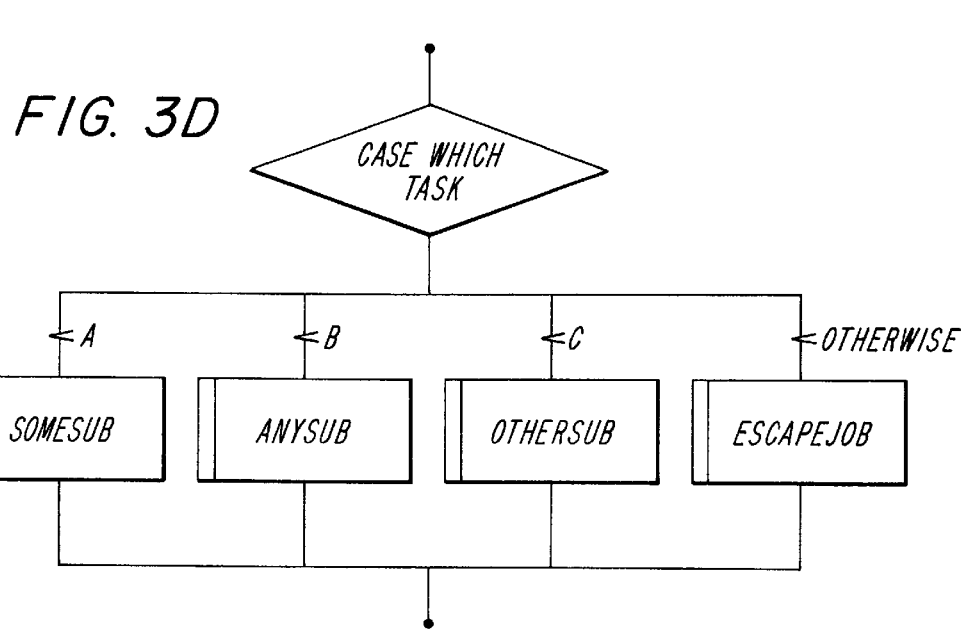

FIG. 3D illustrates how CASE statements often must be handled. Very often the contents of each case must be reduced to a subroutine call in order to enable clear understanding of the functioning of the statement. By the same token, the CASE statement itself must very often be placed inside a routine as the only statement in the body of the routine. This is quite often necessary in order to allow the code associated with a CASE statement and other closely related statements, outside the CASE statement, to fit together on one page.

Figure 3E:
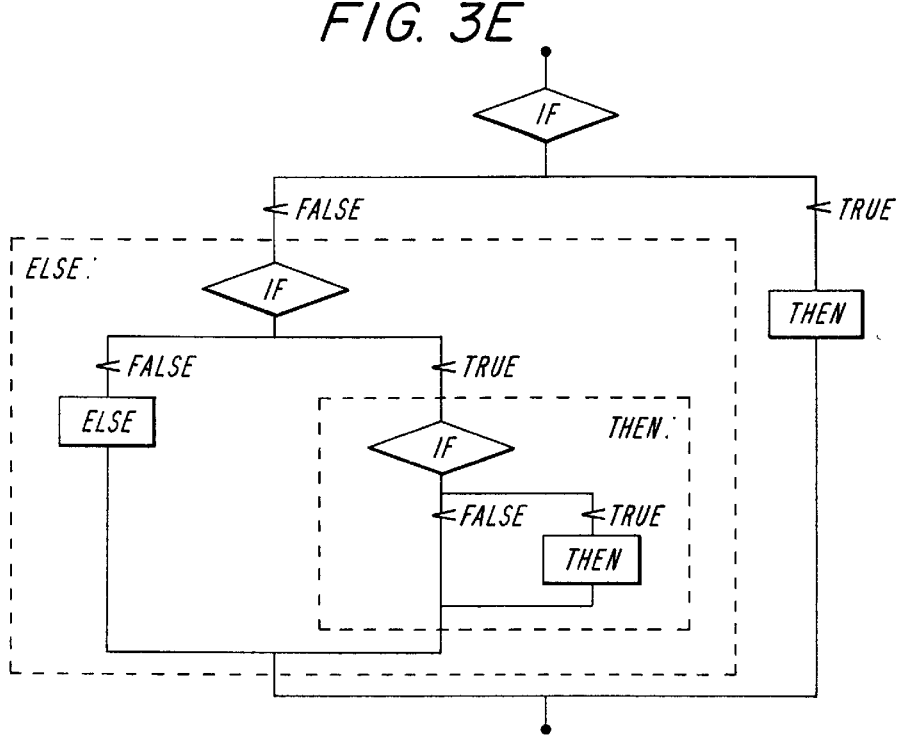

When flowcharts are created according to the method described above, the flowchart results have certain emergent properties that are characteristic as illustrated in FIG. 3E.

First, the entry point at the top of the module of code drawn is always exactly above the exit point at the bottom. Further, it is also possible to draw a box around each area that used to be a statement box. Finally, if a box is drawn around an area that used to be a statement box, that box will be intersected by only two lines, one at the top center and one directly beneath the top line at bottom center.

With respect to the case statement of FIG. 2F, it is shown having only three options or three alternative paths. In actual practice, case statement may have two or more alternative paths. According to a preferred embodiment of the present invention, the user is prompted to allow him to specify the number of paths desired in the icon.

As mentioned above, programs written using the flowchart according to the present invention require that the flowchart for any particular routine must be contained on one page. This is true except for the case situation in which a case statement includes a list of alternatives which is too long to be shown on only one page. To accomplish this, designers should start at the top and work down layer by layer, one at a time, until the final level of detail is reached.

In order to satisfy the prohibition against page breaks, and thereby to create modular code, it is necessary to break a program down into levels. Each level should be a module which is called by the preceding, or some other, level.

The basic rule for creating a level is that from the higher level, one should be able to see the outline of or references to the next lower level. For example, in the design of a ship, one can, in principle, see from the drawing of the ship as a whole, the set of decks of which the ship is comprised. Another example is that of the drawing of a building. From the drawing of the building as a whole, one can, in principle, see approximately how many floors there are in the building.

From the drawing of a specific deck on a ship, one can see where each of the rooms on that deck will be. Likewise, from the drawing of a specific floor plan within a building, one can see each of the rooms on that floor. From the drawing of the engine room on a ship, one can see the engine. From the drawing of an engine, one can see a piston.

This is a rule for design that has been worked out in practice over centuries of engineering. The basic principle of hierarchies described here has been around for much longer than that, however. Engineers are simply imitating nature in following the practice of dividing systems into subsystems and then repeating this process the necessary number of times.

It is absolutely commonplace to find an IF-THEN statement in a program (or flowchart) to be scattered across multiple sheets of paper or screens. A given subroutine (assuming that subroutines even exist in the program) may be scattered across a number of pages. This situation is so commonplace that most designers do not even think of it as being wrong. It is assumed that it is a necessary part of the design of large programs. It is in fact absolutely not necessary. Not only is it not necessary, it is extremely destructive.

Programs should be designed as other objects of engineering practice. There should be one page that describes the program as a whole. For programs that are a single process and the process is not represented by a finite state machine this is virtually always possible to do.

For software units where there are multiple processes, the rule can be modified to say that each process should be described on one page. If the process is modeled as a finite state machine, then it is likely that even a high-level description (which actually makes some sense and does something) will not fit onto one page. In this case, each state of the finite state machine can be fitted onto one page (with occasional exceptions allowed there also). The page-per-module rule can then be applied very rigidly after the state/event intersection occurs. At that point, the software becomes completely identical with sequential (non-real-time) code from the point of view of engineering drawing approach.

Whether this is source code or flowchart does not matter. This is how the principle of hierarchies or layers should be applied to software.

This whole idea often comes as a total shock when proposed to a software designer for the first time. There is no reason, however, why software designers should have to fight with logical statements or signals or routines (in flow-chart or source-code form) that extend across multiple pages. All of the six basic flow forms should (with some exceptions for the CASE statement) always appear on one page. An IF-THEN or IF-THEN-ELSE or WHILE or FOR statement should always start on one page and end on that same page.

Following this rule alone will result in an immediate increase in the quality of software. It is a rule of thumb in virtually all other engineering disciplines except software engineering. Following the "one-page rule" will automatically cause software designers to think in terms of layers, levels, or hierarchies. It will also automatically put a great deal of pressure to represent the thing as a whole at the top level and put lower levels of detail at lower levels. That such a practice, which is absolutely standard in all other engineering disciples, and yet is almost unheard of in software engineering, is astonishing.

A module of code should be no more than one page long. When it becomes more than one page long, it should be broken down into routines.

Whatever can be put into a statement box (according to the rules for structuring) can be put into a routine. If the fragment of code cannot be surrounded by a statement box, then the fragment of code is not a candidate for being converted into a routine.

Generally, there is no consideration given in either flowcharts or source code to considering the program as a set of drawings. Moreover, there is generally little or no consideration given to considering a program as a set of modules. A module as used herein is a subordinate piece of a program as a whole, such as process, routine, subroutine, or procedure.) In the standard "stream" approach the program is treated as a monolithic whole without a breakdown into levels.

The flow forms should never extend across more than one page even if they do contain a long CASE statement. If a CASE statement inside another flow form will cause that flow form to extend across more than one page, then the CASE statement should be placed inside a subroutine. The subroutine call that contains the CASE statement will only occupy one line of source code. The same principle also applies to flowcharts created according to the program of the present invention. This means that all executable code (except for individual CASE statements or lists of signal reception points, that may be longer than one page) must be fitted into modules which are no longer than one page.

Thus, the whole program is to be broken down into units that, with the exception of declarations, lists of signal reception points, and some long CASE statements, each fit onto one page. Thus the program becomes a set of short "programs". Each module is always easy to understand by itself. It must be easy to understand by itself because it is so short that it fits on one page. In practice, this means that a module will be no longer than approximately thirty-three to fifty lines of code. Analogous requirements are placed on the flowcharts created according to the present invention.

The first priority of the designer must be to write a program that is correct. All other considerations must be secondary to this top priority. In order for a designer to be able to write a correct programs there must be organization and order in the code. In order to successfully employ the engineering drawing principle, the designer must make extensive use of routines.

The primary means of providing order in a program is to use structured code. The second most powerful means of providing order in a program is to apply the engineering drawing principle to structured code so that the modules will always be short.

According to preferred embodiments of the present invention, the use of the rules and the icons described above can be implemented using a programmed computer of the type shown in FIG. 1. FIGS. 4A through FIG. 4B illustrate exemplary flowcharts of software routines which may be implemented in order to create the program according to the present invention. The coding of the program, the choice of the language and the computer system to be used is left to the discretion of the reader of this patent. The principles of coding described above maybe implemented in the program according to the present invention as desired using expert system and other programming techniques. It is considered within the skill of the ordinary artisan to implement and code the program according to the present invention once in possession of the present disclosure.

Figure 5:
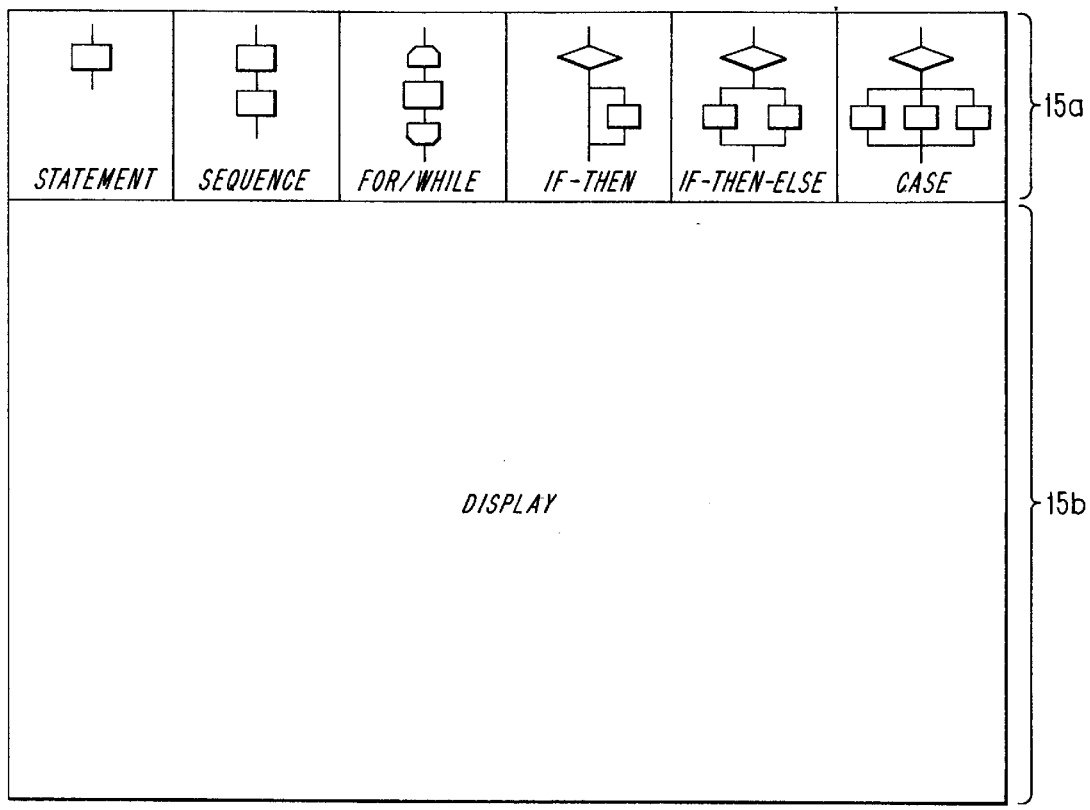
FIG. 5 is an exemplary schematic illustration of a display on which the user interface according to a preferred embodiment of the present invention is displayed.

FIG. 4A illustrates the main routine. Step S300 displays the predetermined set of flowchart icons in one area of the screen display. This display may consist of a windowing arrangement as currently used in many systems or a panel of predetermined icons, as shown in FIG. 5. FIG. 5 illustrates one exemplary display format that may serve as the user interface of the program according to an embodiment of the present invention. The area 15a includes the six basic flow forms icons shown in FIGS. 2A–2F. Area 15b is used as the area in which the flowchart created by the user will be displayed.

Step S310 is a user input routine which is entered whenever it is detected that the user has pressed a key or moved the mouse.

FIG. 4B illustrates the user input subroutine of step S310. A user input step S320 determines whether the user input is a selection of an icon. This selection may either occur by use of a mouse, cursor keys, or touch pad mechanism, e.g., from area 15a. If icon has been selected, the program follows the true path to step S330 which is a user placement routine. This will be described below with reference to FIG. 4C. If the test in step S320 results in a false evaluation, it is tested at step S340 whether it is a text entry. If so, the TRUE path is taken and the user is prompted to input text associated with a previously selected icon. The text input by the user will be placed in the display area 15b adjacent the icon with which it is to be associated. This allows for greater readability, since the text may be larger than the polygon in the icon.

In conventional flowcharting programs, the user is given an opportunity to draw lines connecting various boxes. This is unnecessary in the program according to the present invention since the user placement routine allows icons to be placed either within a statement box of an existing icon or directly below an existing icon where the input line of the second icon is connected to the output line of the first icon. Thus, the flow lines, flowing only downward, are created automatically by the program according to the present invention based on the placement of the selected icon.

Figure 4C:
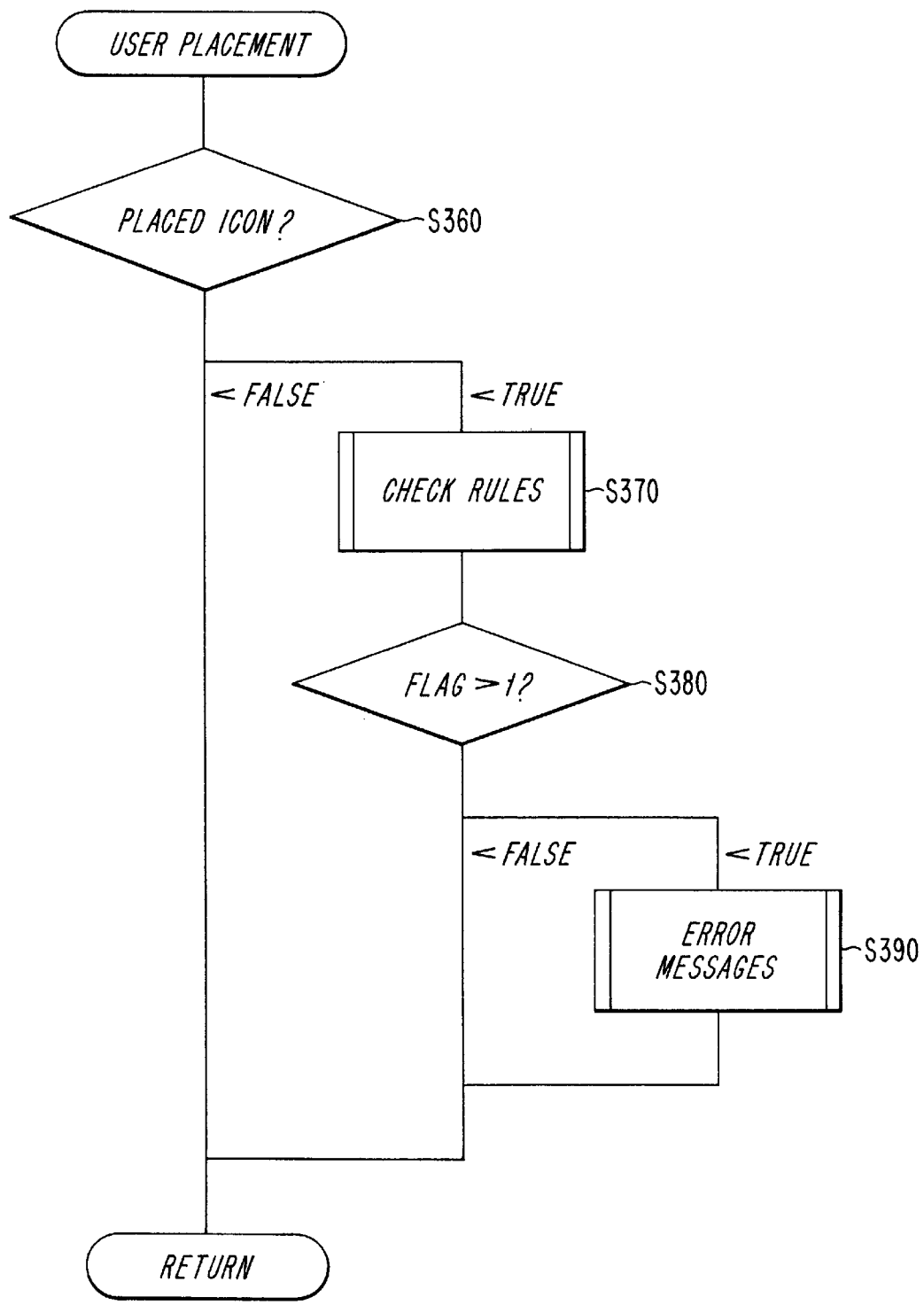
Figure 4D:
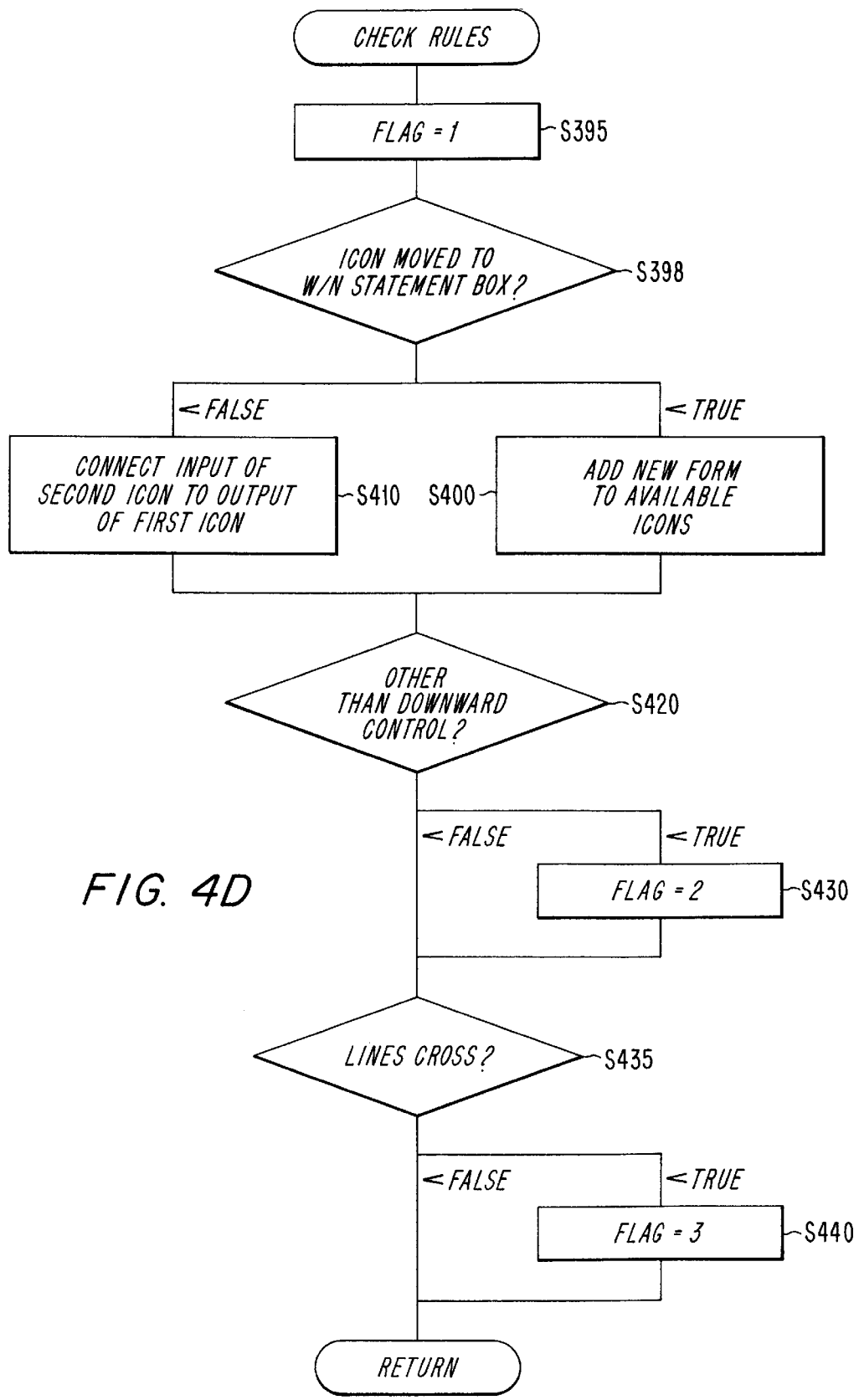

FIG. 4C illustrates the user placement routine according to the preferred embodiment of the present invention. Step S360 determines whether the icon selected is the first icon to be placed in the display area 15b. If so, it is unnecessary to check for appropriate placement of the icon, so the routine ends. If not, the routine is ended. If so, the program enters the check rules routine at step S370. At the end of the check rules subroutine, at step S380, it is determined whether or not the flag is equal to one. This flag is used by the check rules routine to signal that an error has occurred in the placement of the icon. If it is not equal to one, the error message routine is entered. If it is equal to one, the user placement routine ends.

FIG. 4D illustrates the check rules routine. At step S395, a flag is equal to one. This flag signals whether or not the user has incorrectly placed an icon. Step S398 determines whether an icon has been moved to within a statement box. If so, at step S400, the newly created form is added to the available icons that the user may select and stored in temporary memory. These newly created forms may be displayed in a separate area of the display (not shown) so that the user can have access to them using the click and drag mouse, the cursor keys, or touchpad method.

If the answer at step S398 is false, it is assumed that the icon has been placed below the existing icons in the display. In this case, the input of the second icon is connected to the output of the first icon. At step S420, it is determined whether any flow other than downward control is necessary, such as if the icon has not been placed below the existing icons. If this is the case, at step S430, the flag is set to 2. If only directly downward control has been designated, it is determined at step S430 whether any of the lines of the different icons cross one another. If there is a crossing line, the flag is set, at step S440 equal to three. Then the routine ends. If no lines are found to be crossing, the routine ends.

At step S380 in FIG. 4C, if the flag is equal to two or three, the error message routine is entered at step S390 and display of the selected icon is prohibited.

The error message routine is illustrated in FIG. 4E. If the flag equals 2 at step S450, a particular error message is displayed indicating that only downward control is possible and the routine ends. If a flag equals three, at step S470, an error message is displayed indicating that the lines are crossing which is improper and the user is requested to re-enter the position of the new icon.

The basic features of a software implementation of a preferred embodiment of the present invention have been described herein. It is understood that the mechanism by which the icons are displayed, moved, and otherwise manipulated is within the skill of the ordinary artisan once in possession of the present disclosure.

An ideal situation for flowcharts and codes would be to have a computer-aided software engineering (CASE) tool available which would allow the designer to work in either source-code or flow-chart medium according to the preferences of the designer with the demands of the situation. The designer could, for example, start out working in source code to build up data types and other declarations and then switch to flowchart for executable code. As the designer would switch back and forth between flowchart and code, the tool would automatically update the other form. In this manner, the flowchart and source code would automatically be maintained in parallel. This would ensure that the flowchart and code would be identical. The goal of having the flowchart represent the code at a "high level" could be achieved by having the code itself written in a hierarchial or layered manner. Therefore, although there would be flowcharts for even the smallest details of executable code, there would also be generated high-level flowcharts which would correspond to the higher layers of the source code. Even if such a tool were available (as far as is known to the inventor, no such practical tool exists today that meets exactly the requirements specified above), the present invention would still be useful in that it would help the user of the tool to extract maximum possible benefit from the CASE tool. Very few languages force structured code, neither do any of the flowcharting tools in existence force structured flowcharts ("structured" according to the definition herein). This means that even with modern tools and languages, it is still up to the designer to use self discipline to develop structured software products.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology of terminology employed herein is for the purpose of description and not of limitation.

What is claimed is:

1. A method of creating a flowchart using a programmable computer and a display for said programmable computer, the method comprising the steps of:

displaying a predetermined set of basic flow forms on a first area on the display;

providing a selection means by which a user can select two flow forms from said set of basic flow forms;

combining said two selected flow forms to yield a new valid flow form according to placement information provided by the user and a predetermined plurality of rules, said rules requiring that one of said two selected flow forms is placed inside a second of the two selected flow forms or one of said two selected flow forms is placed in a head-to-tail relationship with the other said second of said two selected flow forms, only downward flow of control is required within the said flowchart, and no two lines connecting flow forms cross one another; and displaying the selected flow forms and any new valid flow forms in a second area on said display, wherein any program created from said flowchart is a structured program.

2. The method according to claim 1, wherein said basic flow forms are a statement box, a sequence of two statement boxes, iteration forms for FOR and WHILE statements, alternation forms including boolean forms for IF-THEN and IF-THEN-ELSE statements and CASE statements.

3. The method according to claim 1, wherein the step of combining comprises the steps of:

determining if said placement information provided by the user satisfies said predetermined plurality of rules; and if said placement information does not satisfy said predetermined plurality of rules, displaying appropriate error messages.

4. An apparatus for assembling a flowchart on a programmable computer display such that any program created from said flowchart is a structured program, the apparatus comprising:

means for displaying on said programmable computer display a set of basic flow form icons, each icon comprising at least one polygon having one input line and one output line, each icon having one input line and one output line;

user input means for enabling a user to select at least one of the basic flow form icons; and means for displaying said at least one selected basic flow form icons on a different area of said programmable computer display in a position designated by the user wherein each basic flow form icon comprises a rectangular or square polygon and said means for displaying said selected basic flow form icon comprises:

means for combining two selected flow form icons;

means for determining when said position designated for displaying the selected icon by the user is correct according to predetermined rules, said rules requiring that one of said two selected icons is placed inside a second of the two selected icons or one of said two selected icons is placed in a head-to-tail relationship with the other said second of said two selected icons, permitting only downward flow of control within said flowchart, and prohibiting crossing of any flow line within said flowchart; and means for prohibiting operation of said means for displaying said selected basic flow form icons responsive to a determination by said means for determining that said position designated is incorrect according to said predetermined rules.

5. The apparatus according to claim 4, further comprising:

user input means for inputting text to be associated with said at least one polygon in said at least one selected basic flow form icon; and means for displaying said inputted text in an area adjacent said at least one polygon said at least one selected basic flow form icon.

6. The apparatus according to claim 4, wherein said set of basic flow form icons comprises a statement box icon having one polygon comprising one input line and one output line.

7. The apparatus according to claim 4, wherein said set of basic flow form icons comprises a sequence icon comprising two polygons connected by a line, said sequence icon comprising one input into a first of the two polygons and one output coming from a second of said two polygons.

8. The apparatus according to claim 4, wherein said set of basic flow form icons comprises an iteration form icon for indicating FOR and WHILE language constructs, said iteration form icon comprising:

a first six sided polygon comprising one input line;

a four sided polygon connected to said first six-sided polygon by a line; and a second six sided polygon connected to said four sided polygon by a line and comprising an output line.

9. The apparatus according to claim 4, wherein said set of basic flow form icons comprises two alternation form icons, a first alternation form icon for indicating an IF-THEN language construct having a diamond polygon comprising an input line and one output line, said output line having a false branch extending straight downward from a lowest corner of said diamond polygon and a true branch extending to a right corner of said diamond polygon and comprising a rectangular or square polygon having an output line connected to said false branch such that said first said alternation form icon comprises one input line and one output line;

a second alternation form icon for indicating an IF-THEN-ELSE language construct having a diamond polygon comprising one input line and one output line, said output line splitting to extend both to a right and left branch from said diamond polygon, said right branch being a THEN path of said IF-THEN-ELSE construct and said left branch being a ELSE path of the construct, each branch comprising a rectangular or square polygon having an output line which bends toward each other to meet and form a single output line of said second alternation form icon.

10. The apparatus according to claim 4, wherein said set of basic flow form icons comprises an alternation form icon for indicating a CASE language construct, said alternation form icon comprising a diamond polygon having one input line and one output line, said output line splitting into a plurality of branches corresponding in number to a number of possibilities in said CASE language construct, each branch comprising a rectangular or square polygon having an output line which bends toward each other to meet and form a single output line of the alternation form icon.

11. The apparatus according to claim 4, wherein said input line at a top point of each of said basic flow form icons appears on the display directly above said output line at a bottom point of said basic flow form icon.

12. An apparatus for assembling a flowchart on a computer display such that any program created from the flowchart is a structured program, the apparatus comprising:

means for displaying in a first area of said computer display a predetermined plurality of flowchart icons, each icon comprising at least one statement box, an input line and an output line;

user input means for indicating selection of one of said plurality of flowchart icons;

user input means for indicating placement of said selected icon in a second area of said computer display;

means for determining whether said indicated placement of said selected flowchart icon satisfies predetermined rules, said predetermined rules allowing for placement of one icon inside a statement box of another previously selected icon to form a new flowchart icon, allowing for placement of one icon in a head-to-tail relationship with another icon, allowing only downward flow of control within said flowchart, and prohibiting crossing of any flow line within said flowchart; and means for temporarily adding to said predetermined plurality of flowchart icons any new flowchart icon created by said user input means for indicating placement.

13. The apparatus according to claim 12, further comprising:

user input means for inputting text to be associated with said at least one polygon in said at least one selected flowchart icon; and means for displaying said inputted text in an area adjacent said at least polygon in said at least one selected flowchart icon.

14. The apparatus according to claim 12, wherein said predetermined plurality of flowchart icons comprises a statement box icon, a sequence icon comprising two connected statement boxes, an iteration form icon for forming FOR and WHILE statements, alternation form icons for forming IF-THEN and IF-THEN-ELSE statements and for forming CASE statements.

* * * * *